Figures 1, 2:
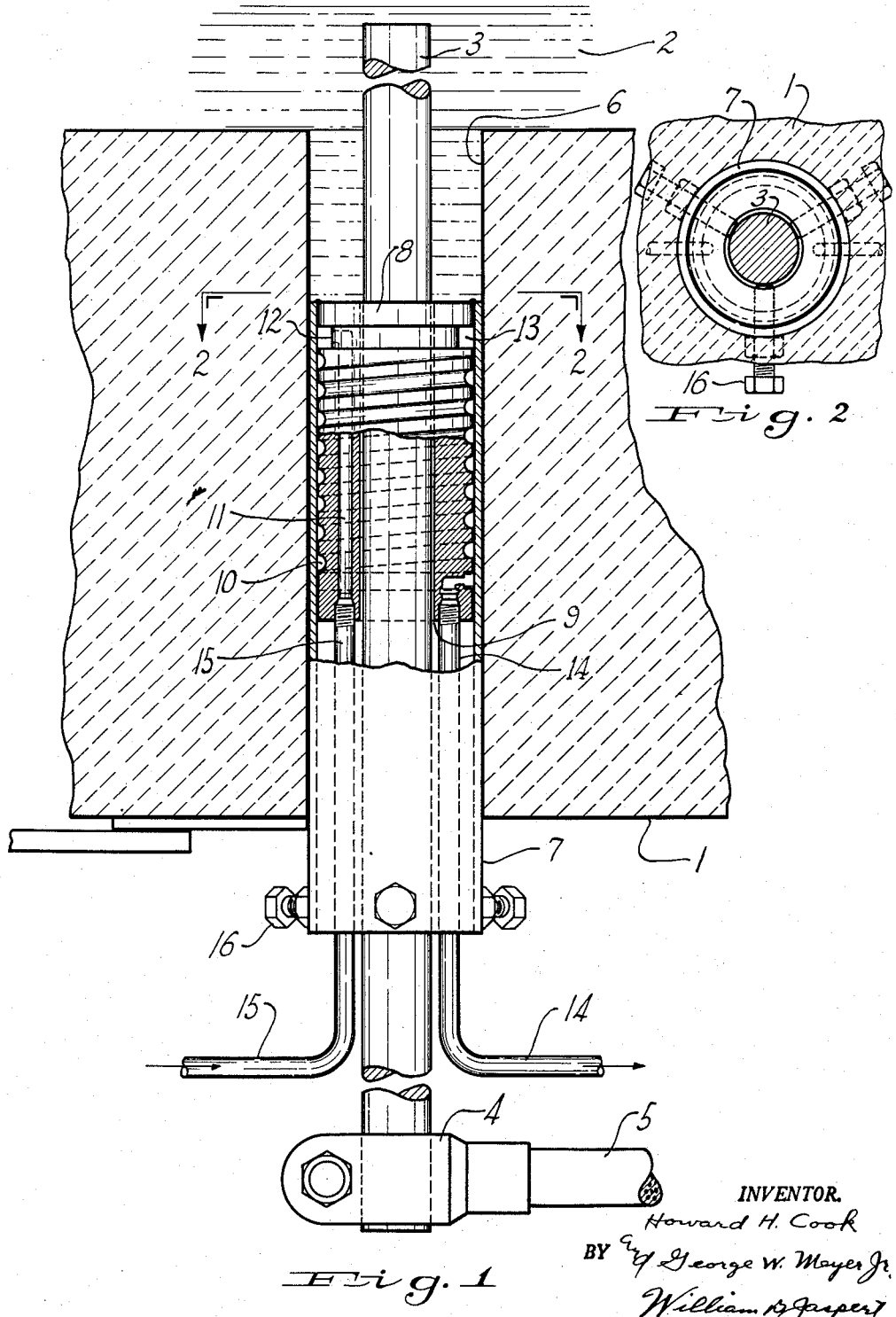

2,877,282

WATER COOLED ELECTRODE HOLDERS

Howard H. Cook and George W. Meyer, Jr., Glenshaw, Pa.

Application January 7, 1957, Serial No. 632,789

2 Claims. (Cl. 13—17)

This invention relates to new and useful improvements in water cooled electrode holders for use in booster heating of glass in glass melting furnaces.

In general, the process of producing glass takes place in a furnace wherein the batch of raw materials is introduced at one end, and passes continuously through various states of heat and emerges at the other end as workable glass for use in making various products such as bottles. During its travel through the furnace, the batch is successively melted, fined or made homogeneous, and finally further adjusted in temperature to make it suitable for working into the desired products. Generally, the heat for this process is provided by burners placed above the glass as it is being processed, usually fired by oil or gas flame, and referred to as main burners. In addition, it is advantageous under certain conditions, to supplement the heat of the main burners with heat introduced directly into the bath of glass being processed. This is achieved by inserting suitable electrodes through the containing shell of the furnace, one end connected to a source of electrical energy, and the other projecting into the bath of glass. This supplementary heating is referred to as booster heating.

In using electrodes as described above, it is necessary that means be provided for adjusting the distance such electrodes project into the glass through the shell, and also to provide effective cooling where the electrode enters the bath immediately inside the shell. This cooling is a necessary provision in order to provide proper electrical functioning of the electrode and also to prevent escape of the molten glass through any clearance that is necessary or may be present immediately surrounding the electrode.

It is among the objects of this invention to provide a water cooled electrode holder of a composite structure that may be assembled and inserted in place as a unit.

It is a further object of this invention to provide a water cooled electrode holder with an effective cooling element for cooling the portion of the electrode where it enters the glass bath, and for sealing any clearances necessary or present about the electrode against the escape of glass.

These and other objects of the invention will become more apparent from a consideration of the accompanying drawing, constituting a part hereof in which like reference characters designate like parts and in which:

Fig. 1 is a vertical section, partially in elevation, of a water cooled electrode in a glass melting furnace shell, embodying the principles of this invention; and, Fig. 2, a cross-sectional view, partially in elevation, taken along the line 2—2 of Fig. 1.

In the drawing, the numeral 1 designates the refractory shell of a glass melting tank which supports the molten glass 2. The numeral 3 designates the electrode, which may be of molybdenum or other suitable material to resist deterioration and wear. The electrode 3 is connected to the terminal 4 of an electrical conductor 5 that supplies the electrical energy, a plurality of such electrodes being employed in spaced relation in the shell of the furnace to supplement the heat supplied by the main burners. After the electrode has been partially worn away at the tip, it is desirable and necessary to advance it further into the glass batch to maintain proper electrical characteristics.

For this purpose it is found desirable to mount the electrode 3 in a holder which consists of a metal tubing 7 which is of the diameter of the bore 6 in the furnace shell, and disposed within the tube 7 is an electrode holder generally designated by the numeral 8. This holder has a substantial clearance, as shown at 9, with the electrode 3 so that the latter is freely movable in the holder under certain conditions. The electrode 3 is held at various positions within the tubing 7 by means of set screws 16 mounted so as to have a clamping effect on the electrode. The electrode holder 8 is a metal member, and is provided with a helical groove 10 and a bore 11, the latter terminating at 12 in an annular groove 13. One end of the helical groove 10 is connected to a water tube, as shown at 14, and the bore 11 is connected to a second water tube 15 that extends beyond the bottom end of the holder 8 and leads to a source of cooling water, the cooling system being such that the water entering the tube 15 as shown by the arrow, passes upward through the bore 11 to the groove 13, and then passes downwardly through the flow passages 10 to the tube 14 by which it is expelled, as shown by the arrow.

In the operation of the above-described electrode, it is inserted in the shell of the furnace in the following manner:

The hole 6 is drilled through the furnace shell of diameter to receive the tubing 7, with electrode holder 8 fixed within such as by welding or other suitable fastening. The electrode 3 is inserted within the holder 8 and clamped by means of set screws 16 in a position to provide the proper projection into the glass bath. The electricity is then introduced, which among other effects, produces localized heating of the glass where the electrode first enters the bath at the innermost surface of the electrode holder 8. This causes the glass to penetrate slightly the clearance 9 about the electrode, and possibly any clearance that might exist between the hole 6 and the exterior of tubing 7, causing a complete air seal. The cooling water is then introduced through the conduit 15 and passes directly to the annular groove 13 in the electrode holder 8, cooling that general portion of the holder and the electrode and causing the adjacent glass to cool and stiffen, preventing leakage. The cooling water proceeds outwardly through the helical passage 10 in the holder, further cooling the electrode, holder, tubing and adjacent furnace shell, and is expelled through conduit 14. This cooling process also reduces wear and erosion on the electrode assembly by reducing the temperature and electrical conductivity in the area cooled.

If it is desired to adjust the electrode 3 at any time, the cooling water is shut off for a sufficient time to permit re-heating in the area where it enters the glass, which then becomes molten again and permits the electrode to be advanced or withdrawn as desired. When the cooling water is again turned on, the glass and electrode parts are again cooled as described above.

It is evident from the foregoing description of this invention that electrode holders made in accordance therewith provide an efficient and reliable means for mounting electrodes in the shell of glass melting furnaces, providing durability and permitting ease of adjustment.

Although one embodiment of the invention has been herein illustrated and described, it will be evident to those skilled in the art that various modifications may be made in the details of construction without departing from the principles herein set forth.

We claim:
1. An electrode holder for assembly in a wall of a glass melting furnace comprising a cylindrical outer shell for mounting in a bore in said wall with a portion protruding from the wall, a relatively thick walled cylindrical bushing disposed in and having a sealed fit with the inner wall of said shell, an electrode slidingly mounted to be axially adjustable in said bushing, means for securing said electrode in its adjusted position and an electrical connection for said electrode, said bushing having an annular groove at one end and a helical groove on its outer surface communicating with said annular groove and terminating short at the other end of said bushing, separate flow ducts extending from said grooves through the wall of said bushing and fluid flow connections for said ducts at the protruding end of the hollow shell to circulate a coolant in said grooves.

2. An electrode holder for assembly in a wall of a glass melting furnace comprising a cylindrical outer shell for mounting in a bore in said wall with a portion protruding from the wall, a relatively thick walled cylindrical bushing disposed in and having a sealed fit with the inner wall of said shell, an electrode slidingly mounted to be axially adjustable in said bushing, means for securing said electrode in its adjusted position and an electrical connection for said electrode, said bushing having an annular groove at one end and a helical groove on its outer surface communicating with said annular groove and terminating short at the other end of said bushing, said grooves forming fluid flow passages with the inner wall of the shell and having flow ducts extending through the wall of said bushing and fluid flow connections at the protruding end of the hollow shell to circulate a coolant in said grooves.

References Cited in the file of this patent

UNITED STATES PATENTS

| | | |
|---|---|---|
| 2,405,236 | Rhoades et al. | Aug. 6, 1946 |
| 2,736,759 | Penberthy | Feb. 28, 1956 |